(12) United States Patent
Downing et al.

(10) Patent No.: US 6,289,335 B1
(45) Date of Patent: Sep. 11, 2001

(54) FAST REFRESH OF SNAPSHOTS CONTAINING SUBQUERIES

(75) Inventors: Alan Downing, Fremont; Harry Sun, Redwood City; Ashish Gupta, Menlo Park, all of CA (US)

(73) Assignee: Oracle Corporation

( * ) Notice: Subject to any disclaimer, the term of this patent is extended or adjusted under 35 U.S.C. 154(b) by 0 days.

(21) Appl. No.: 08/880,928

(22) Filed: Jun. 23, 1997

(51) Int. Cl.$^7$ .................................................. G06F 17/30
(52) U.S. Cl. .............................. 707/3; 707/101; 707/102
(58) Field of Search ............................... 707/1, 3, 2, 201, 707/101, 4, 5, 6, 7–9, 102, 103, 500; 364/283, 4, 282, 222; 711/112, 113, 129

(56) References Cited

U.S. PATENT DOCUMENTS

| | | | |
|---|---|---|---|
| 4,631,673 | * 12/1986 | Haas et al. ........................... | 707/101 |
| 5,333,316 | * 7/1994 | Champagne et al. ................ | 707/8 |
| 5,440,735 | * 8/1995 | Goldring ............................. | 707/3 |
| 5,548,754 | * 8/1996 | Pirahesh et al. .................... | 707/2 |
| 5,557,791 | * 9/1996 | Cheng et al. ....................... | 707/2 |

* cited by examiner

Primary Examiner—Wayne Amsbury
Assistant Examiner—Thu-Thao Havan
(74) Attorney, Agent, or Firm—Ditthavong & Carlson, P.C.

(57) ABSTRACT

A method and apparatus for fast refreshing a subquery snapshot creates the snapshot based on a first table and a second table according to a snapshot definition query, which contains one or more subqueries. Information about modifications to the first and second tables is stored in first and second log, respectively. When a refresh operation is initiated, the snapshot is refreshed by reconciling differences between the snapshot, the first table and second table according to the snapshot definition query, the first log, the second log, the first table, and the second table.

33 Claims, 16 Drawing Sheets

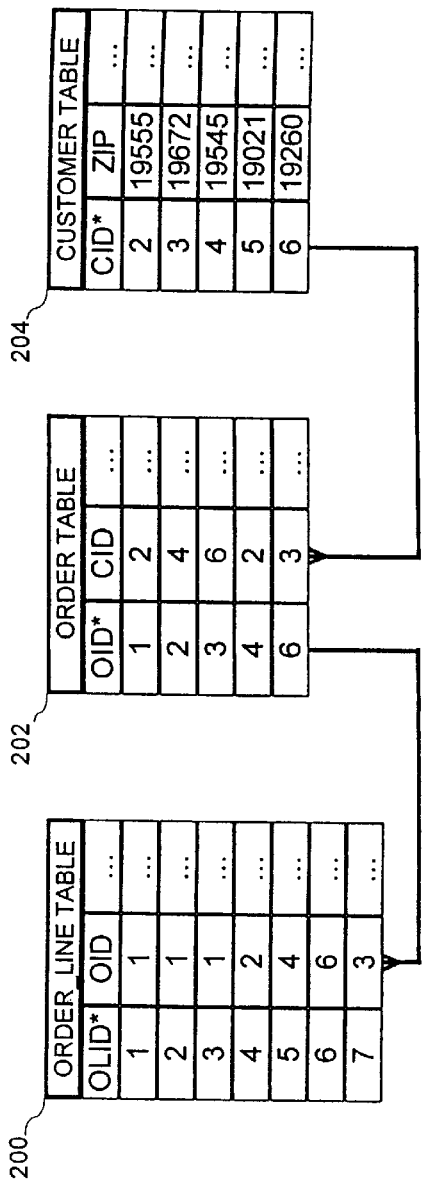
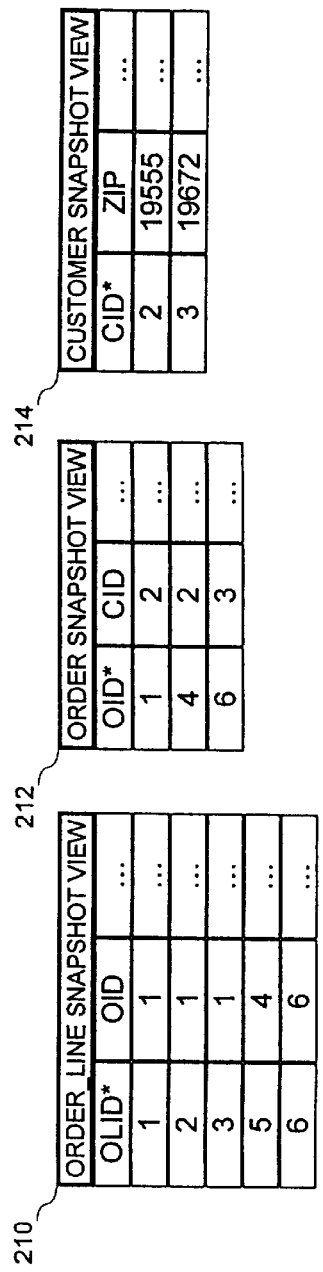
Figure 2(a)
Figure 2(b)

Figure 2(c)

DENORMALIZED ORDER_LINE TABLE (220)

| OLID* | OID | CID | ZIP | ... |
|---|---|---|---|---|
| 1 | 1 | 2 | 19555 | ... |
| 2 | 1 | 2 | 19555 | ... |
| 3 | 1 | 2 | 19555 | ... |
| 4 | 2 | 4 | 19545 | ... |
| 5 | 4 | 2 | 19555 | ... |
| 6 | 6 | 3 | 19672 | ... |
| 7 | 3 | 6 | 19260 | ... |

DENORMALIZED ORDER TABLE (222)

| OID* | CID | ZIP | ... |
|---|---|---|---|
| 1 | 2 | 19555 | ... |
| 2 | 4 | 19545 | ... |
| 3 | 6 | 19260 | ... |
| 4 | 2 | 19555 | ... |
| 6 | 3 | 19672 | ... |

Figure 4(a)

| ORDER_LINE TABLE | |
|---|---|
| OLID* | OID |
| 1 | 1 |
| 2 | 1 |
| 3 | 1 |
| 4 | 2 |
| 5 | 4 |
| 6 | 6 |
| 7 | 3 |

| ORDER_LINE LOG | | | | |
|---|---|---|---|---|
| OLID | TIME$$ | MOD$$ | OLD$$ | CHG$$ |

Figure 4(b)

| ORDER_LINE TABLE | |
|---|---|
| OLID* | OID |
| 1 | 1 |
| 2 | 1 |
| 4 | 2 |
| 5 | 4 |
| 6 | 6 |
| 7 | 3 |
| 8 | 6 |

| ORDER_LINE LOG | | | | |
|---|---|---|---|---|
| OLID | TIME$$ | MOD$$ | OLD$$ | CHG$$ |
| 3 | 4000 | D | O | 00... |
| 8 | 4000 | I | N | 11... |

Figure 4(c)

| ORDER_LINE TABLE | |
|---|---|
| OLID* | OID |
| 1 | 1 |
| 2 | 1 |
| 4 | 2 |
| 5 | 4 |
| 6 | 6 |
| 7 | 3 |

| ORDER_LINE LOG | | | | |
|---|---|---|---|---|
| OLID | TIME$$ | MOD$$ | OLD$$ | CHG$$ |
| 3 | 4000 | D | O | 00... |

1200 — OLD ORDER_LINE SNAPSHOT

| OLID* | OID | ... | CID |
|---|---|---|---|
| 1 | 1 | ... | 2 |
| 2 | 1 | ... | 2 |
| 3 | 1 | ... | 2 |
| 5 | 4 | ... | 2 |
| 6 | 6 | ... | 3 |

1202 — NEW ORDER_LINE SNAPSHOT

| OLID* | OID | ... | CID |
|---|---|---|---|
| 4 | 2 | ... | 4 |
| 6 | 6 | ... | 3 |
| 7 | 3 | ... | 4 |
| 8 | 6 | ... | 3 |

1204 — ORDER_LINE LOG

| OLID | TIME$$ | MOD$$ | OLD$$ | CHG$$ |
|---|---|---|---|---|
| 3 | 1 | D | O | 00... |
| 8 | 1 | I | N | 11... |

1206 — ORDER LOG

| OID | TIME$$ | MOD$$ | OLD$$ | CHG$$ |
|---|---|---|---|---|
| 4 | 1 | U | U | 01... |
| 3 | 1 | U | U | 01... |

1208 — CUSTOMER LOG

| CID | ZIP | TIME$$ | MOD$$ | OLD$$ | CHG$$ |
|---|---|---|---|---|---|
| 2 | 19555 | 1 | U | O | 01... |
| 4 | 19545 | 1 | U | O | 01... |

| ORDER_LINE SNAPSHOT | | | |
|---|---|---|---|
| OLID* | OID | ... | CID |
| 1 | 1 | ... | 2 |
| 2 | 1 | ... | 2 |
| 3 | 1 | ... | 2 |
| 5 | 4 | ... | 2 |
| 6 | 6 | ... | 3 |

1310

| ORDER_LINE SNAPSHOT | | | |
|---|---|---|---|
| OLID* | OID | ... | CID |
| 1 | 1 | ... | 2 |
| 2 | 1 | ... | 2 |
| 3 | 1 | ... | 2 |
| 6 | 6 | ... | 3 |

1320

| ORDER_LINE SNAPSHOT | | | |
|---|---|---|---|
| OLID* | OID | ... | CID |
| 6 | 6 | ... | 3 |

| ORDER_LINE SNAPSHOT | | | |
|---|---|---|---|
| OLID* | OID | ... | CID |
| 6 | 6 | ... | 3 |
| 7 | 3 | ... | 4 |

1350

| ORDER_LINE SNAPSHOT | | | |
|---|---|---|---|
| OLID* | OID | ... | CID |
| 6 | 6 | ... | 3 |
| 7 | 3 | ... | 4 |
| 4 | 2 | ... | 4 |
| 7 | 3 | ... | 4 |

| ORDER_LINE SNAPSHOT | | | |
|---|---|---|---|
| OLID* | OID | ... | CID |
| 4 | 2 | ... | 4 |
| 6 | 6 | ... | 3 |
| 7 | 3 | ... | 4 |

1370

| ORDER_LINE SNAPSHOT | | | |
|---|---|---|---|
| OLID* | OID | ... | CID |
| 4 | 2 | ... | 4 |
| 6 | 6 | ... | 3 |
| 7 | 3 | ... | 4 |
| 8 | 6 | ... | 3 |

FAST REFRESH OF SNAPSHOTS CONTAINING SUBQUERIES

FIELD OF THE INVENTION

This invention relates to snapshots for database systems and more particularly to a method and system that allows for improved "fast refreshes" of snapshots.

BACKGROUND OF THE INVENTION

A snapshot is a body of data constructed of data from a "master" table. The master table may be local or remote relative to the snapshot. The data contained within a snapshot is defined by a query that references the master table and optionally other tables, views or snapshots. A snapshot can be refreshed on a periodic basis to reflect the current state of its corresponding base tables. An "updatable snapshot" is a snapshot to which updates may be directly made. Such updates are propagated from the snapshot back to the master table.

One method of refreshing snapshots is to reissue the defining query for the snapshot and simply replace the previous snapshot data with the results of the reissued query. This method is referred to as a "complete refresh." Complete refreshes are particularly disadvantageous when the master and snapshot tables are located at different sites in a network, because data for the entire refreshed snapshot table must be sent through the network.

Alternatively, another method known as a "fast refresh" can be performed to expedite the refresh operation, by transferring to the snapshot only those changes to the master table which have been made since the last refresh of the snapshot. A log file (referred to as a "master log") can be employed to track and record the rows that have been updated in the master table. When a snapshot is refreshed, only the appropriate rows in the master log need to be applied to the snapshot table. In a networked environment, only those modified rows found at the master site are transferred across the network and updated or inserted into the snapshot. Rows deleted in the master table are also deleted in the snapshot. Fast refresh is typically faster, more efficient, and involves less network traffic than a complete refresh.

For example, a company with 100 sales associates maintains three tables, shown in FIG. 2(*a*) to keep track of its sales information. Customer table 204 is a table that contains information about the company's customers. One of the columns in the table is a customer identifier (CID), which is a primary key, uniquely assigned to each customer. In the figures, primary key columns are indicated by an asterisk (*). Another column in table 204 is ZIP, which stores the zip code of the customer. Other columns, not shown, include street addresses, telephone numbers, and so forth. Order table 202 contains information about a customer's order. Each row in the order table has an order identifier (OID) and a CID. Each customer may place several orders, so there is a many-to-one relationship between the CID column of customer table 204 and the CID column of order table 202. In the figures, the many-to-one relationship is designated by a line connecting two tables with an inverted "V" on the "many" side. Order line table 200 stores an order line identifier (OLID) and an OID. Since each customer can have several orders, and each order several order lines, order line table 200 is usually much larger than customer table 204.

In this example, sales associates are assigned their territories by zip code, and they would like to keep a copy of only the relevant sales information on their laptop computers. Thus, if sales associate Smith is assigned only to zip codes 19555 and above, then Smith is only interested in the customers, orders, and order lines for zip code 19555 and above. Consequently, Smith creates a snapshot with a snapshot definition query for each table to retrieve that information in the snapshot. Since a snapshot also stores administrative information, the database system presents to Smith a snapshot view, which hides that administrative information. In FIG. 2(*b*), customer snapshot view 214 is the result of creating the snapshot with the following SQL query:

[QUERY 1]

select * from customer where ZIP>=19555.

Order snapshot view 212 is more complicated, because order table 202 is partitioned on data found in customer table 204. The select statement in the order snapshot definition query:

[QUERY 2]

select * from order
where exists (select CID from customer
where order.CID = customer.CID and ZIP >= 19555)

is a subquery. The table outside the subquery is an "outer table," and the table inside the subquery is an "inner table." In this example, order table 202 is the outer table, and customer table 204 is an inner table. This subquery includes an "equijoin" predicate, order.CID=customer.CID, and a filter predicate, ZIP>=19555. An equijoin predicate connects a unique key of an inner table to an "equijoin" column of an outer table, in this case, column CID. A filter predicate refers to a "filter" column that is used in partitioning the data. In this case, since sales territories are assigned according to zip codes, the ZIP column of customer table 204 serves as a filter column.

A snapshot definition query may include nested subqueries. For example, order line snapshot view 210, containing the relevant rows of order line table 200 for sales associate Smith, is defined by the following query containing subqueries:

[QUERY 3]

select * from order_line
where exists (select OID from order
where order_line.OID = order.OID
and exists (select CID from customer
where order.CID = customer.CID and ZIP >= 19555)).

The order line table for a company is often too large to fit on a sales associate's laptop, but an order line snapshot defined for a particular sales associate is typically small enough for the portable laptop computer.

Snapshots are useful for sales associate Smith, because Smith can keep information about Smith's customers on a portable laptop computer. Before each sales trip, Smith requests a refresh of the snapshots on the laptop. In this situation, fast refresh is preferable to complete refresh, because fast refresh is much faster. Relatively few changes need to be brought over to the snapshot because customers rarely change their addresses, and most of the changes are new orders and order lines. However, in prior systems only customer snapshot 214 is fast refreshable, because prior systems cannot fast refresh snapshots whose snapshot definition queries use subqueries.

To circumvent this restriction, database users are forced to "denormalize" their tables if they want the performance benefits of fast refresh. For example, order table 202 is denormalized by appending the information contained in customer table 204, resulting in denormalized order table 222 in FIG. 2(c). Consequently, the zip code information for a particular customer is now found in two separate tables, in customer table 204 and denormalized order table 222. Order line table 200 is denormalized by appending information found in customer table 204 and order table 202 to create denormalized order line table 220. In denormalized order line table 220, the zip code information for a particular customer is now found in separate rows of the same table as well as in three separate tables.

Denormalization imposes significant database maintenance costs. For example, if customer 2 moves to zip code 19554, then rows in denormalized order table 222 and denormalized order line table 220 must be updated in addition to the row in customer table 204. Every point of change of a particular piece of information carries a risk of error, and it is desirable to reduce the number of points of change.

Furthermore, a company may change the criteria according to which sales associates are assigned to customers. For example, a company may decide to assign sales associates on an individual basis, storing in the assignments in assignment table 300 of FIG. 3. Assignment table 300 lists the assignments of a customer, indicated by CID, and a sales associate, indicated by SID. Sales associate table 302 uses SID as a primary key and includes information about each sales associate. In the example, if a company starts assigning sales associates by an assignment table, rather than by zip code, then the zip code columns in all the denormalized tables must be deleted and replaced by an SID column. This is another error-prone point of change, caused by using denormalized tables.

Therefore, there is a need for a database system than can perform a fast refresh of snapshots defined by queries containing subqueries.

SUMMARY OF THE INVENTION

According to one aspect of the invention, a method of refreshing a snapshot includes the step of creating the snapshot based on a snapshot definition query on two or more master tables, in which the snapshot definition query contains one or more subqueries. In response to initiation of a refresh operation, a fast refresh is performed on the snapshot.

Another aspect of the invention is a method of refreshing a snapshot. The method includes the step of creating the snapshot based on a plurality of master tables and a snapshot definition query. The plurality of master tables includes an outer table and one or more inner tables, and the snapshot definition query contains at least one subquery on one of the inner tables. Each master table has a primary key, the value of which is recorded into a master log in response to detecting a modification to the master table. In response to initiation of a refresh operation, differences between the snapshot and the master tables are reconciled based on the master log.

According to yet another aspect of the invention, a method for fast refreshing a subquery snapshot includes the step of creating the snapshot based on a first table and a second table according to a snapshot definition query, which contains a subquery. In response to detecting a first modification to a first row of the first table, the primary key value stored in the first row is recorded in a first log along with a first value indicative of the first modification. In response to detecting a second modification to a second row of the second table, the primary key value stored in the second row is recorded in a second log along with a second value indicative of the second modification. When a refresh operation is initiated, the snapshot is refreshed by reconciling differences between the snapshot, the first table and second table according to the snapshot definition query, the first log, the second log, the first table, and the second table.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2(a) depicts a customer table, an order table, and an order line table.

FIG. 2(b) depicts a customer snapshot view, an order snapshot view, and an order line snapshot view.

FIG. 2(c) depicts a denormalized order line table and a denormalized order table.

FIGS. 4(a)–(c) depict a series of states of an order line table and a corresponding order line log.

FIGS. 6(a)–(c) depicts a series of states of a customer table and a corresponding customer log.

FIG. 12 depicts exemplary snapshots and master log used to illustrate the operation of a fast refresh operation.

FIGS. 13(a)–13(c) depict is a series of states of a fast refreshed snapshot according to an embodiment.

DESCRIPTION OF THE PREFERRED EMBODIMENT

A method and apparatus for refreshing a snapshot are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
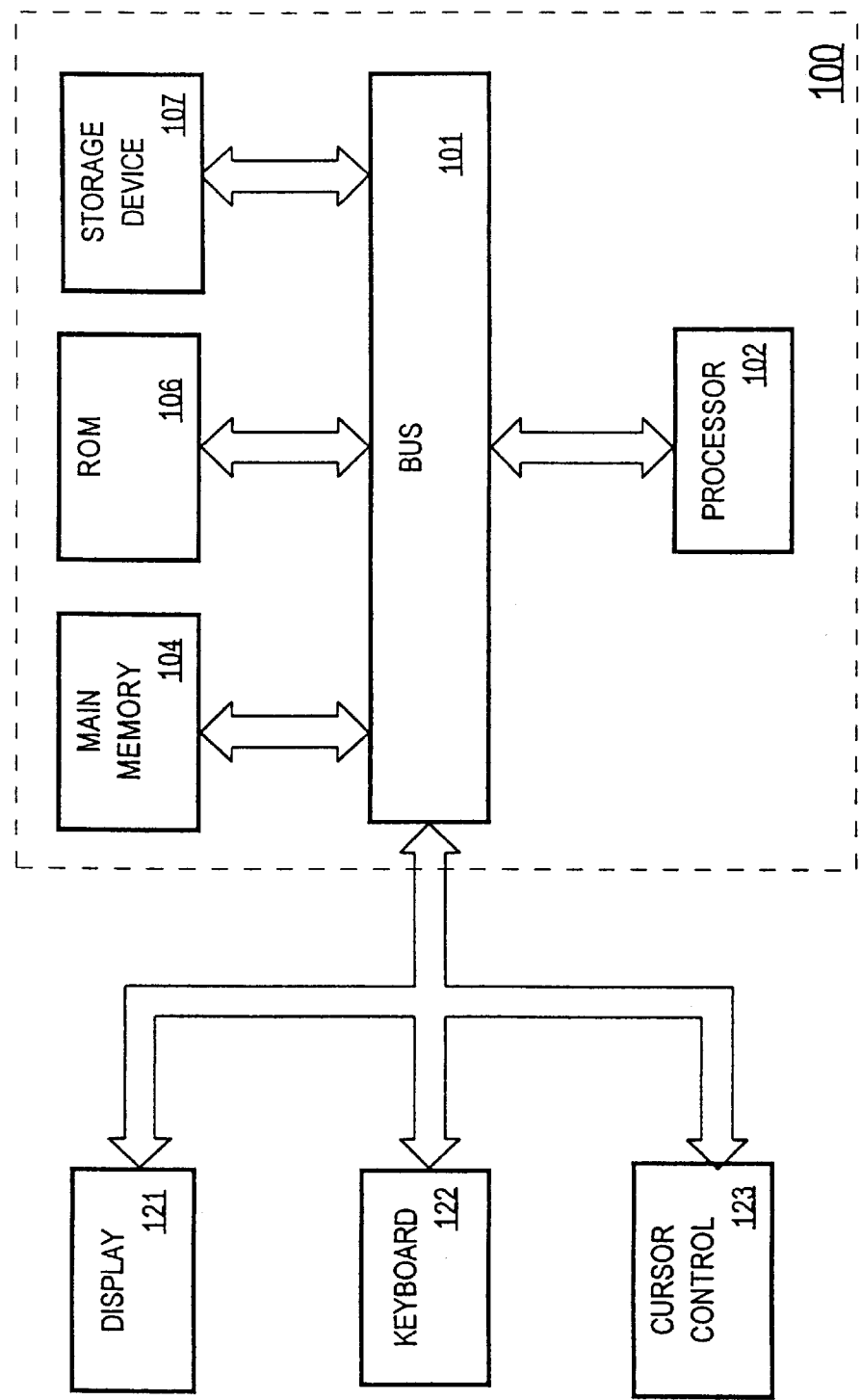
FIG. 1 is high-level block diagram of a database system according to an embodiment of the present invention.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to fast refresh a snapshot. According to one embodiment, fast refreshing a snapshot is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

Subquery Snapshots

Techniques are described herein for fast refreshing a snapshot that is defined by a snapshot definition query that contains one or more subqueries. Snapshots that are defined by queries that include one or more subqueries are referred to herein as "subquery snapshots".

According to one embodiment, restrictions are imposed on which kinds of subquery snapshots may be fast refreshed. Specifically, except for the presence of a subquery, the snapshot definition query must otherwise be a simple query. In other words, the snapshot definition query cannot contain non-subquery joins, aggregates, set operations, GROUP BYs, or CONNECT BYs.

Preferably, negative subqueries are not allowed because their rarity does not justify the additional coding and maintenance costs. A negative subquery contains a predicate of the form "where not exists," while a positive subquery contains a predicate of the form "where exists." However, the present invention is not limited to embodiments that exclude support for fast refresh of subquery snapshots that contain negative subqueries.

All master tables involved in a subquery snapshot must have a primary key. A primary key is a set of one or more columns in a table having a combined value that is unique and non-null within the table. Thus, a primary key value is able to uniquely identify each row in the table. Snapshots from master tables having primary keys are further described in the commonly assigned U.S. Pat. No. 5,963,959, entitled "Fast Refresh of Snapshots," filed on May 30, 1997 by Harry Sun and Alan Downing, the contents of which are incorporated by reference. In addition, the subqueries in the snapshot definition query must be correlated via an equijoin on an entire key of another table. That is, all of the columns of a unique key must be equijoined. A unique key is a set of one or more columns in a table having a combined value that is unique within the table. A primary key is a unique key, but a table may contain other unique keys.

For example, QUERY 3 does not contain any non-subquery joins or aggregates or other complex predicates. QUERY 3 contains positive, not negative, subqueries. Each master table in QUERY 3, (order line table 200, order table 202, and customer table 204) has a primary key (OLID, OID, and CID, respectively). The two subqueries are correlated through an equijoin on primary key columns. For example, the outer subquery is correlated through the OID primary key column of order table 202, and the inner subquery is correlated through the CID primary key column of customer table 204. Therefore, QUERY 3 is a query that defines a subquery snapshot that may be fast refreshed according to a preferred embodiment of the invention.

Modifications to Inner Tables

There are three aspects to fast refreshing a subquery snapshot. First, the information about modifications to master tables appropriate for subquery snapshots is logged in the master table logs. Second, the appropriate administrative information is stored in the snapshot itself. Finally, the fast refresh method reconciles the differences between the master tables and the subquery snapshot based on the information in the master table logs, master tables, and the snapshot itself.

Changes to the outer table can cause rows to be deleted, inserted, or updated in the snapshot. Changes to inner tables, however, can only cause rows to go in or out of the snapshot; they cannot update a row in the snapshot. Different actions need to be taken in refreshing a subquery snapshot, depending on the nature of the column in an inner table that is modified.

There are three important types of master table columns: primary key columns, equijoin columns, and filter columns. If a column is both a primary key column and either an equijoin column or a filter column, then that column is considered to be a primary key column for purposes of logging information about the modification and selecting rows to refresh. If a column is both an equijoin column and a filter column, then that column qualifies as a filter column during the logging operation.

Master Logs

In order to support subquery snapshots, master logs record the primary key values, the filter values, and information about the modification for each row that is inserted, deleted, or modified in a corresponding master table. Master logs can be implemented as a buffer in main memory, or preferably in a persistent storage such as a file on a hard disk. In some implementations, master logs can be the same as a transaction log, but in other implementations, master logs are stored in a separate file.

There is a variety of techniques known in the art for detecting modifications of rows of a master table and recording information about the modification in a master log, but the present invention does not require any particular technique. Preferably, in-line triggers are used, which are described in more detail in the commonly assigned U.S. Pat. No. 5,926,819, entitled "In-line Triggers," filed on May 30, 1997 by Sandeep Jain, Mark Ramacher, and Lip B. Doo, the contents of which are incorporated by reference.

Figure 5:
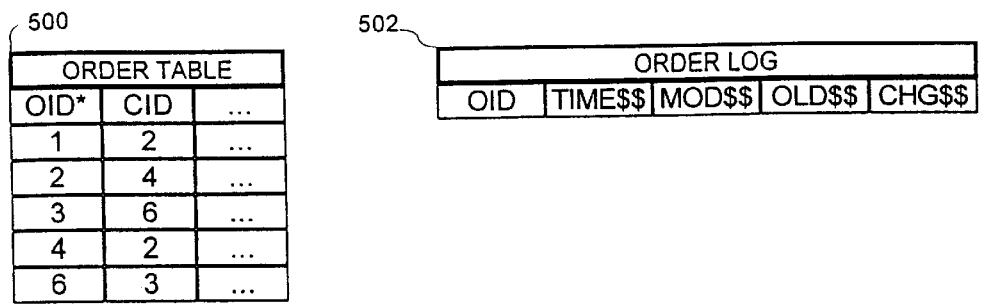
FIGS. 5(a)–(c) depict a series of states of an order table and a corresponding order log.

FIGS. 4–6 illustrate a series of modifications a user might make to a master table and the corresponding entries recording in a master log. FIGS. 4(a), 4(b), and 4(c) illustrate a series of changes made to order line table 400, which is the same as order line table 200, described above. At the point in time illustrated in FIG. 4(a), the corresponding order line log 402 is empty.

In FIG. 4(b), a row 412 is added to order line log 402 as the result of deleting an order line with an OLID of 3 from order line table 400. Consequently, the primary key value of the deleted row, 3, is recorded in order log row 412. In one embodiment, information about the modification is stored in three fields. The first field, MOD$$, indicates the type of modification performed. Entries in the MOD$$ field can have one of three values, 'D' to indicate that a row was deleted, 'I' to indicate that a row was inserted, and 'U' to indicate that a row was updated. The second field, OLD$$, indicates whether the primary key value for the row has changed and whether the primary key value is old ('O'), new ('N'), or unchanged ('U'). Changes to a primary key column require two entries, one to indicate the old value and another to indicate the new value. The third field, CHG$$, is a bit vector that indicates which column in particular has a new or changed value.

In this example, since a row was deleted, MOD$$ is a 'D' for deletion. OLD$$ is 'O' because the primary key value is no longer valid after the operation, and CHG$$ is all zeros because all columns of the row do not have new values, being deleted. In a preferred embodiment, a default value for an additional field, TIME$$, is also stored to enable multiple snapshots to share the same master table.

In FIG. 4(c), a row 422 is added to order line log 402 as the result of adding a new order line with an OLID of 8 and an OID of 6 to order line table 400. Consequently, the primary key value of 8 is stored in the new row 422 of order line log 402. Since a row was inserted, MOD$$ is an 'I' for insertion. OLD$$ is 'N' because the primary key value is valid after the operation, and CHG$$ is all ones because all columns of the row are affected.

Figure 5B:
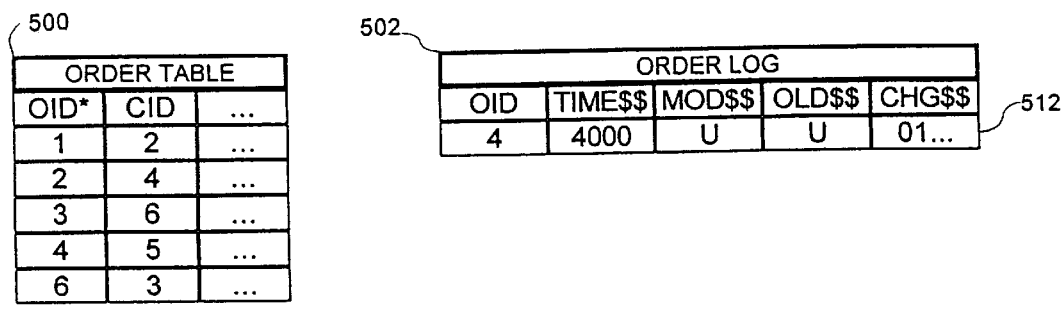
Figure 5C:
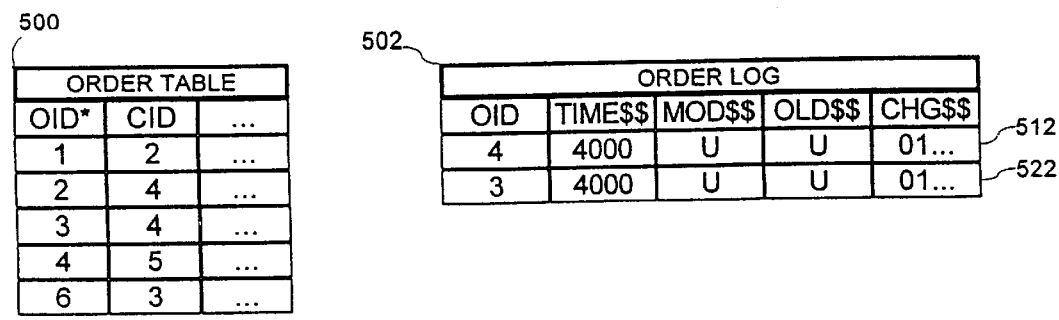

FIGS. 5(a), 5(b), and 5(c) illustrate a series of modifications a user might make to an equijoin column of a table. Order table 500 is a table of orders, each row having an order identifier (OID) and a customer identifier (CID). Since the example subquery makes an equijoin on the customer identifier of a customer table, column CID is an equijoin column. At the point in time illustrated in FIG. 5(a), order log 502 is empty.

In FIG. 5(b), table 500 has been modified as the result of changing the customer identifier from 2 to 5 for the order identified by an OID of 4 in order table 500. Consequently, the primary key value of 4 is stored in a new entry 512 of order log 502 to identify the modified row. Since a row was updated, MOD$$ is an 'U' for update. OLD$$ is 'U' because neither the primary key value nor filter value is changed during the operation. CHG$$ has a zero in the first position of the bit vector to indicate that the OID column was unchanged and a one in the next position to indicate that the CID column was changed.

In FIG. 5(c), order table 500 has been modified as the result of changing the customer identifier from 6 to 4 for the order identified by an OID of 3 in order table 500. Consequently, the primary key value of 3 is stored in a new entry 522 of order log 502 to identify the modified row. Since a row was updated, MOD$$ is an 'U' for update. OLD$$ is 'U' because no primary key value or filter value was changed during the operation. CHG$$ has a zero in the first position of the bit vector to indicate that the OID column was unchanged and a one in the next position to indicate that the CID column was changed.

Figures 6A, 6B, 6C:
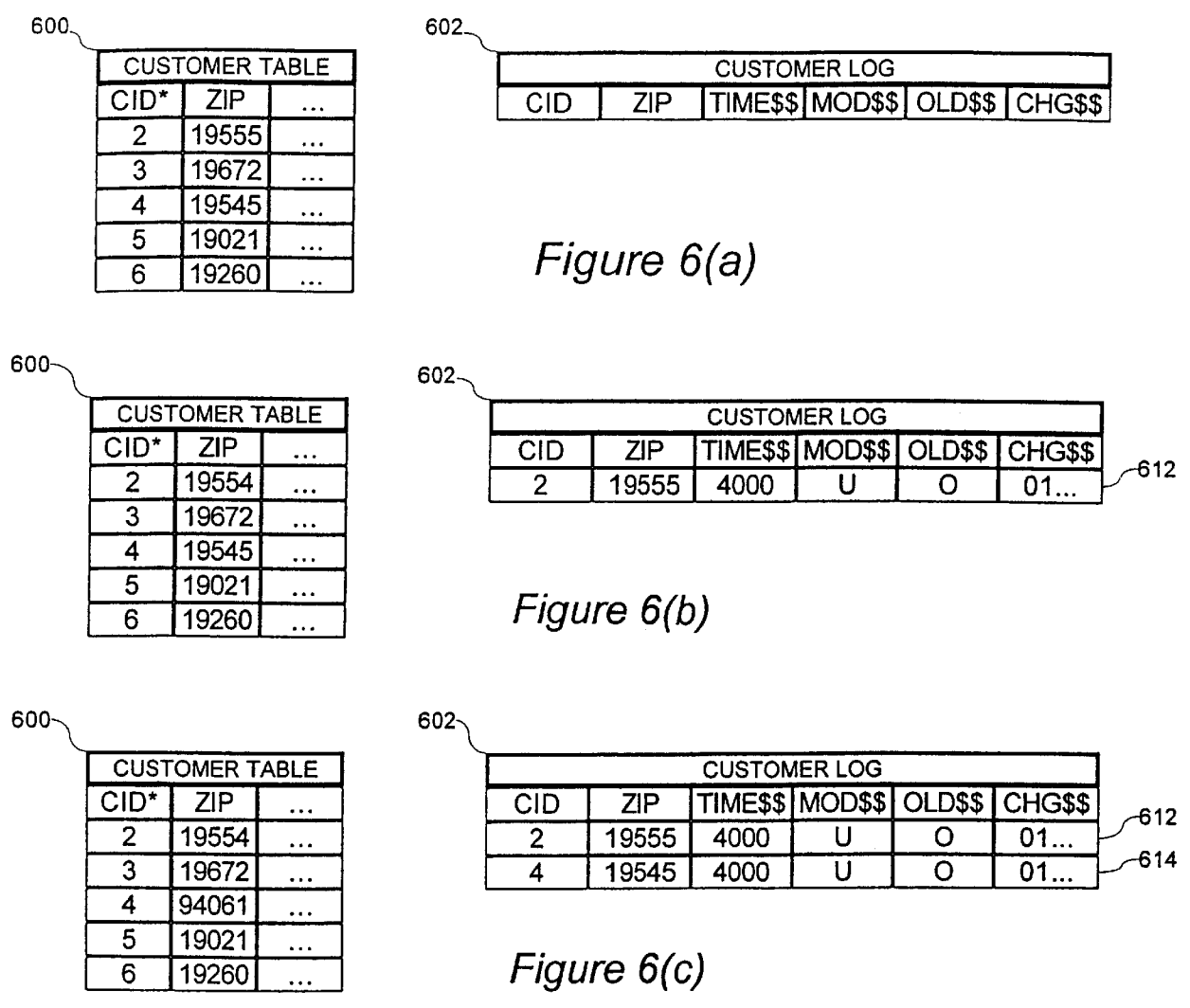

FIGS. 6(a), 6(b), and 6(c) illustrate a series of modifications a user might make to a filter column of a table. Customer table 600 is a table of customers, each row having a customer identifier (CID) and a zip code (ZIP). Since the example subquery partitions the data on the zip code of the customer, column ZIP is a filter column. At the point in time illustrated in FIG. 6(a), customer log 602 is empty.

In FIG. 6(b), customer table 600 has been modified as the result of changing the zip code for the customer identified by a CID of 2 from 19555 to 19554 in customer table 600. Since a filter value was changed, entry 612 is recorded in customer log 602, with the primary key value of 2 to identify the modified row of customer table 600. Since a row was updated, MOD$$ is a 'U' for update, and OLD$$ is 'O' because the filter value recorded in the entry is the value before the modification. It is not necessary to record the new value of the filter column, because the most current filter value at the time of refresh is found in the master table. CHG$$ has a zero in the first position of the bit vector to indicate that the CID column was unchanged and a one in the next position to indicate that the ZIP column was changed.

In FIG. 6(c), customer table 600 has been modified as the result of changing the zip code for the customer identified by a CID of 4 from 19545 to 94061. Since a filter value was changed, entry 614 is recorded in customer log 602, with the primary key value of 2 to identify the modified row of customer table 600. Since a row was updated, MOD$$ is a 'U' for update, and OLD$$ is 'O' because the filter value recorded in the entry is the value before the modification. CHG$$ has a zero in the first position of the bit vector to indicate that the CID column was unchanged and a one in the next position to indicate that the ZIP column was changed.

Multiple Snapshots on the Same Master Tables

In order to prevent master logs from growing indefinitely, entries in the master logs are purged after being used. In a preferred embodiment, however, more than one snapshot may use the same master logs to conserve disk storage for the master logs, so it is important not to purge entries that other snapshots have not yet used. Accordingly, a refresh timestamp is maintained for each snapshot at the master site. The refresh timestamp for a snapshot indicates the time at which the snapshot was last refreshed.

Moreover, each entry in the master logs contains a field for a refresh timestamp, TIME$$. When the entry is first added to a master log, a default value for the timestamp is placed in the TIME$$ field. When the entry is first used in a refresh operation, the default value is changed to reflect the time of the refresh operation, as explained hereafter with reference to the flowchart of FIG. 9(a). The default value is preferably a distant time in the future, such as Jan. 1, 4000 A. D.

Updateable Snapshots

One embodiment of the invention is related to updateable snapshots. An updateable snapshot is a snapshot to which a user is allowed to make changes at the snapshot site. Changes to the snapshot are detected, preferably with an in-line trigger, asynchronously or synchronously propagated to the master site, and logged in an updateable snapshot log. The information stored in an updateable snapshot log is analogous to the information stored in a master log. The column values for the primary key columns of a modified row are recorded in an updateable snapshot log, along with a default timestamp. In addition, information about the nature of the modification is recorded as in the master logs. This information may include, for example, a modification type (MOD$$), a value indicating changes to the primary key values (OLD$$), and a bit vector of changed columns (CHG$$).

Format of Snapshots

The snapshot that a user actually sees is a view on a snapshot table, created by a database system. A view only shows a subset of a table, allowing additional data that may not be relevant for the user of the view to be stored without being displayed to the user. Accordingly for subquery snapshots, additional administrative information is stored in columns in the snapshot itself but not displayed in the view. In particular, the snapshot contains all the primary keys of the master tables referenced in the snapshot definition query as well as the normal columns in the snapshot view.

Figure 7A:
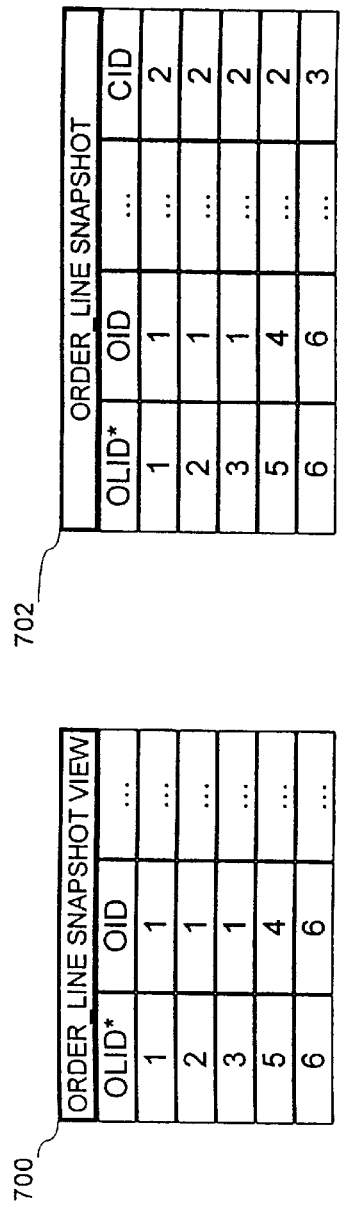
FIGS. 7(a)–(b) depict a snapshot view and a snapshot according to an embodiment.

For example, order line snapshot view 700, derived from QUERY 3 as the snapshot definition query applied to master tables 200, 202, and 204, is shown in FIG. 7(a). Order line snapshot view the same as order line snapshot view 210 in FIG. 2(b). Order line snapshot view 700 is a view on order line snapshot 702, but does not show the CID column that is added to order line snapshot 702. Order line snapshot 702 has a column for each of the primary keys for its master tables: OLID, of the order line table, OID, of the order table, and CID of the customer table. Order line snapshot 702 also includes columns of the order line table for the snapshot view, which comprise at least columns OLID and OID. Since the OID column of the order line table is equijoined to the primary key OID column of the order table, those columns in the snapshot would be identical. Accordingly, one of the redundant columns is preferably not stored in the snapshot.

Figure 7B:
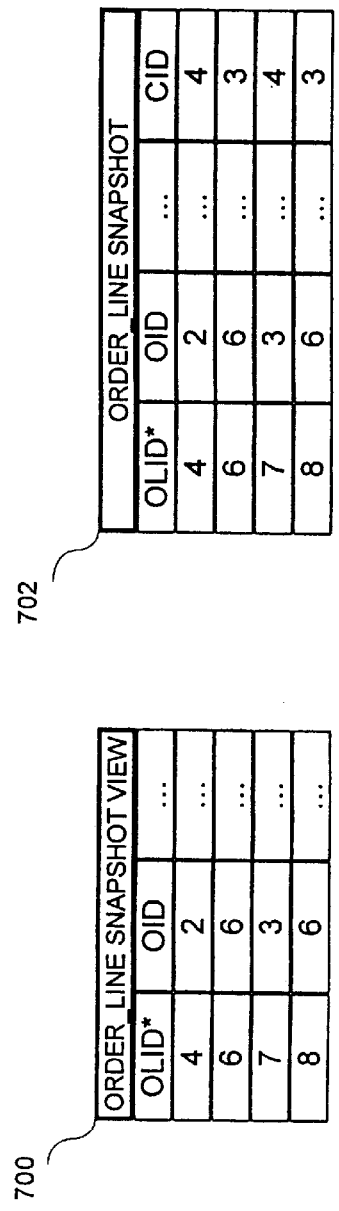

In FIG. 7(b), order line snapshot view 700 and order line snapshot 702 have been modified as the result of reapplying snapshot definition query QUERY 3 to the master tables which were modified as illustrated in FIGS. 4–6. Consequently, order line snapshot 702 in FIG. 7(a) is out-of-date and needs to be refreshed. One step of a fast refresh is to determine which rows of order line snapshot 702 need to be removed and which rows need to be brought over from the master site to the snapshot site.

Refresh Operation

Snapshots are distinguished from other types of materialized views in that snapshots are brought up-to-date with respect to the master tables in response to initiation of an explicit refresh command. This explicit refresh command usually comes from a user, but may be periodically generated in the background by a computer system after a prescribed amount of time or after a prescribed number of logged entries. Thus, snapshots are only made consistent with the master tables at specific points in time. This feature of snapshots is particularly useful for laptop computers, which are only occasionally connected to a main database system housing the master tables.

Figure 8A:
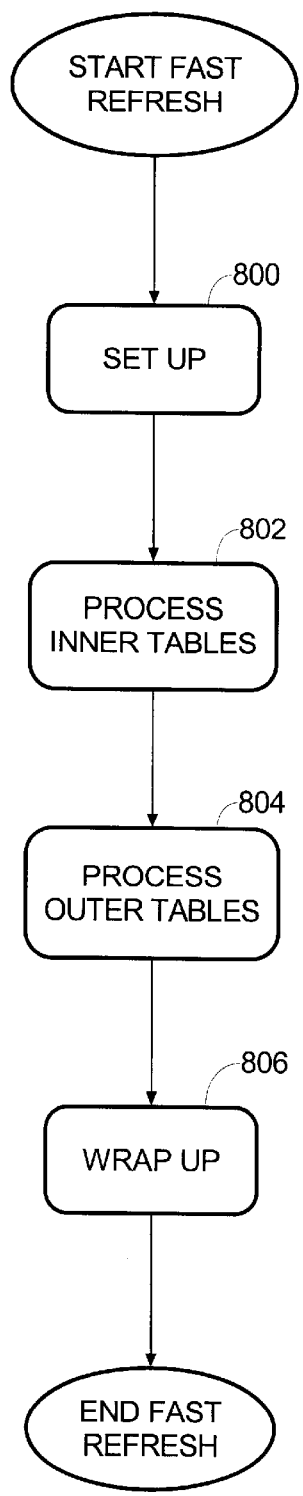
FIG. 8(a) is a flowchart illustrating the steps of fast refreshing a snapshot according to an embodiment.

The high level steps of a fast refresh operation according to one embodiment are shown in FIG. 8(a). In response to initiation of a fast refresh operation, the database system at the master site starts with a "set-up" step (step 800). After the set-up, the inner tables are processed to determine which rows to remove from the snapshot and which rows to bring over and insert into the snapshot due to changes to the inner tables (step 802). After the inner tables are processed, the outer table is processed to determine which snapshot rows need to be deleted, inserted, or modified (step 804). The final high-level step is the "wrap-up" step (step 806). These steps are discussed in more detail in the following sections.

Set-Up

Figure 9A:
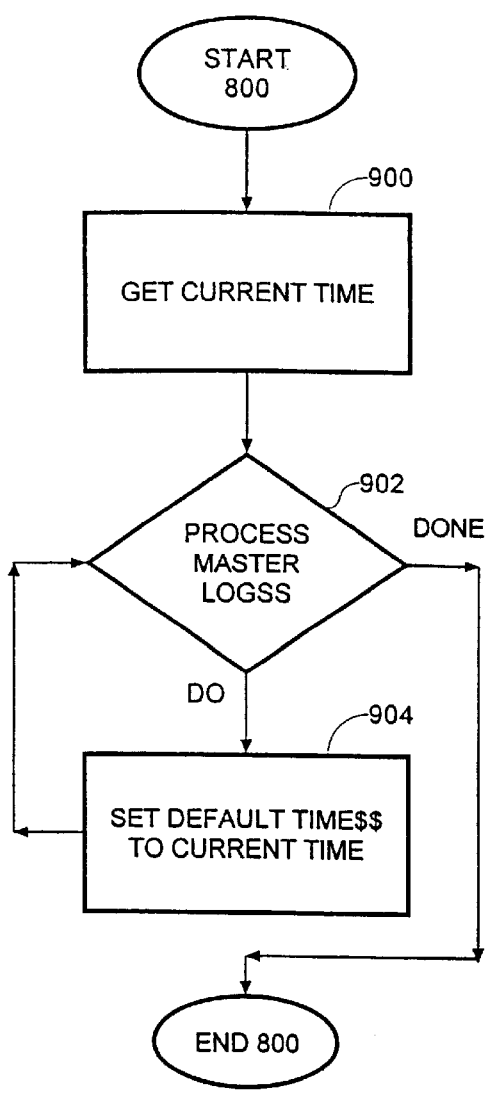
FIGS. 9(a) and 9(b) are flowcharts illustrating the operation of the "set-up" and "wrap-up" steps according to an embodiment.

The purpose of set-up step 800 is to mark the default refresh timestamp values to the current refresh time. With reference to FIG. 9(a), the database system determines the current time (step 900). Then all the master logs for the snapshot are individually processed in a loop (step 902). Each master log is scanned for entries having the default refresh timestamp value in the TIME$$. In those entries, the value of the TIME$$ column is set to the current refresh time. When all master logs have been processed, the operation of the set-up step is complete.

For purposes of explanation, the operation of a fast refresh is discussed with reference to FIGS. 12 and 13. FIG. 12 depicts old order line snapshot 1200, order line log 1204, order log 1206, and customer log 1208 after performing set up step 800. Old order line snapshot 1200 is the same as order line snapshot 702 and was created using QUERY 3 as a snapshot definition query on order line table 200, order table 202, and customer table 204. Order line log 1204 is a master log of changes a user might make to order line table 200. Order line log 1204 is the same as order line log 402 in FIG. 4(c), except that the TIME$$ values were reset to a current refresh time, 1 in this example. Similarly, order log 1206 and customer log 1208 are the same as order log 502 in FIG. 5(c) and customer log 602 in FIG. 6(c), but for the TIME$$ column, respectively. New order line snapshot 1202 is the result of reapplying QUERY 3 as a snapshot definition query on order line table 400 in FIG. 4(c), order table 500 in FIG. 5(c), and customer table 600 in FIG. 6(c). FIGS. 13(a), 13(b), and 13(c) depict an example of intermediate values of the order line snapshot at various points during the fast refresh operation. These intermediate values would only exist within the refresh transaction, and only the final A result would be visible after the refresh transaction is complete. If an error occurs during the fast refresh operation, the snapshot is restored to its original state before the start of the refresh.

Processing the Inner Tables

Figure 10:
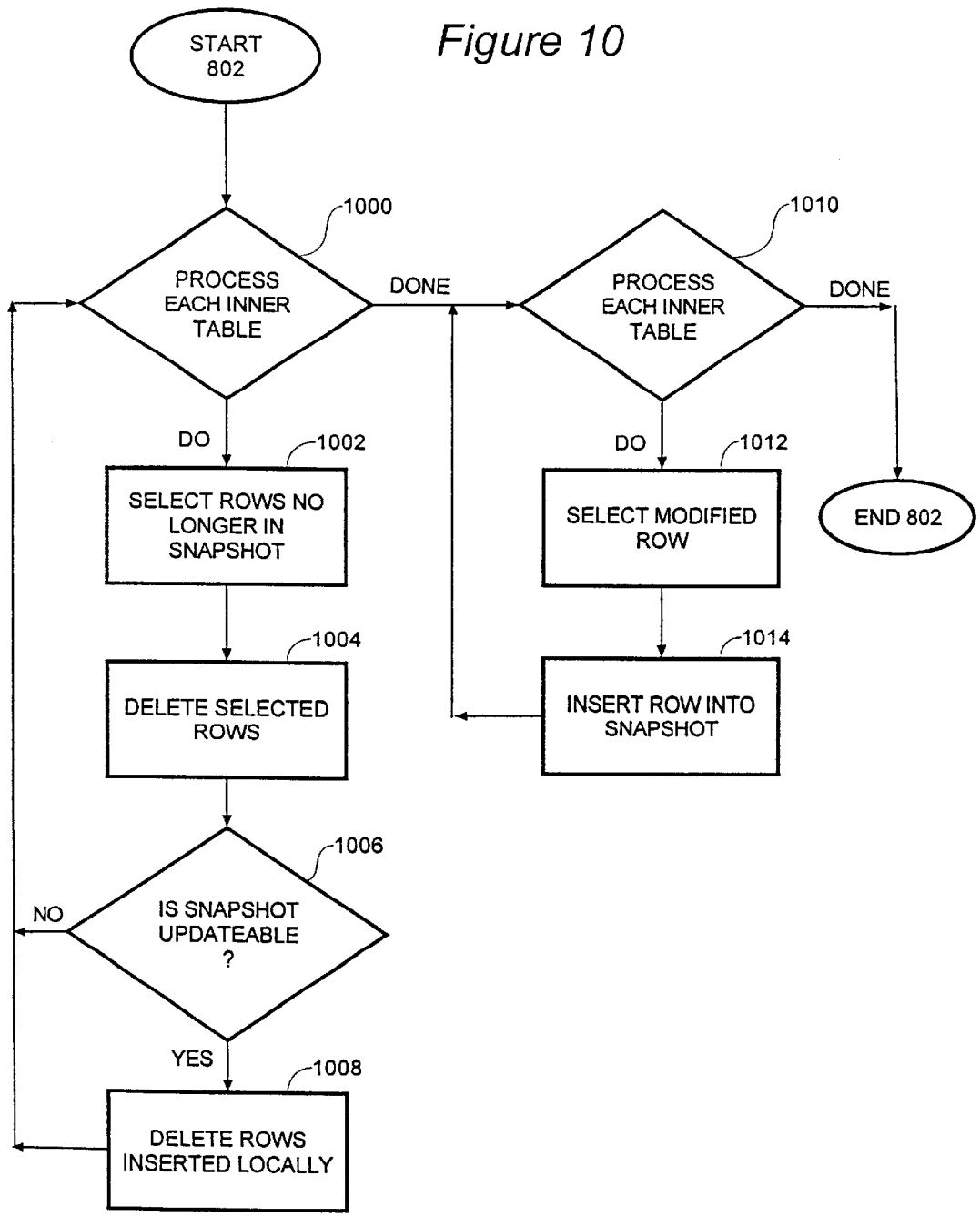
FIG. 10 is a flowchart illustrating the operation of processing inner tables.

With reference to FIG. 10, the operation of step 802 is further described. Processing the inner tables involves two passes over the inner tables. The first pass, controlled by step 1000, loops over the inner tables to determine which rows in the snapshot need to be deleted and deletes them. The second pass, controlled by step 1010, loops over the inner tables to determine which rows of new order line snapshot 1202 need to be inserted into old order line snapshot 1200. Exemplary successive states of the order line snapshot during the first pass are illustrated in FIG. 13(a) and the successive states of the order line snapshot during the second pass are illustrated in FIG. 13(b).

Inner Table Deletion Pass

At step 1000, the first pass, each inner table is successively considered. Within the loop, starting at step 1002, primary key values are selected from each inner table master log that do not belong in the new snapshot. In one embodiment, to select those primary key values the database system executes an SQL query whose general form is as follows:

---

[QUERY 4]

--- select distinct [primary key] from mlog$
where [filter condition in log entry is true] and
    (mlog$.TIME$$ > snaptime) and
    ((mlog$.OLD$$ in ('O', 'U') and is_equijoin(CHG$$)) or   {1}
    (mlog$.OLD$$ = 'O' and is_filter(CHG$$) and not exist   {2}
        (select NULL from mview$
          where mview$.[primary key] = mlog$.[primary key])) or
    (mlog$.MOD$$ = 'D'))   {3}

---

In this query, the material in brackets is filled in with the appropriate matter when the SQL query is generated. The snaptime identifier is the time of the previous refresh to avoid selecting rows that are known to have been used in the previous refresh. The identifier mlog$ stand for the particular master log under consideration.

The identifier mview$ stands for the "truth," a view of the master table containing the actual values with which the refreshed snapshot is made consistent. For example, the query associated with mview$ for a snapshot defined by QUERY 3 would look like:

---

[QUERY 3a]

--- select order_line.*, customer.CID from order_line, order, customer
where order_line.OID = order.OID and order.CID = customer.CID
    and customer.ZIP >= 19555;

---

QUERY 3a is derived by "flattening" the subquery into a join using techniques that are common in query optimization and then ensuring that the hidden columns described in the section FORMAT OF SNAPSHOTS are also selected.

The macros is_equijoin and is_filter of QUERY 4 test the CHG$$ bit vector to determine whether an equijoin column or a filter column was changed, respectively. In an embodiment, the CHG$$ bit vector is compared against another bit vector. For example, with respect to the is equijoin macro, the database system initializes a first bit vector that has zeros at non-equijoin columns and ones at equijoin columns. This first bit vector is "masked" with the CHG$$ bit vector, that is, compared against the CHG$$ bit vector by a bitwise-and, wherein a non-zero result indicates that one of the columns in the CHG$$ bit vector is an equijoin column. Likewise, for the is_filter macro, the database system initializes a second bit vector, having ones at filter columns and zeros at non-filter columns, for masking out the changed filter columns. Since, as explained above, deleted rows have a CHG$$ bit vector of all zeros, masking the CHG$$ bit vector does not identify changed equijoin or filter columns due to deletion. This approach is safe, however, because condition {3} selects all deleted rows.

QUERY 4 selects primary key values of rows for deletion if one of following three conditions, annotated with a number in braces, is true:

{1} An equijoin column was modified. Preferably, a modification of an equijoin column always causes at least a temporary deletion of a relevant row. If the equijoin column was modified to match a primary key value of another row, then the next pass will reinsert the relevant row. This uncomplicated approach is adopted because the relative rarity that an equijoin column would be modified does not justify the expense of extra code to avoid a few potentially redundant refresh operations.

{2} A filter column was changed from a value might cause a row to be deleted from the snapshot. It is possible for a filter value to change multiple times between refreshes, thus it is important to determine whether any one of the changes in filter values potentially causes the row to be out of the snapshot. If so, then the row is removed from the snapshot. If one of the other changes in filter value ultimately causes the row to be in the snapshot, then the second pass will add that row back.

{3} A row was deleted from the inner table.

For example, if the first inner table being considered is the order table, then the following SQL statement is generated in one embodiment:

---

[QUERY 4a]

--- select distinct OID from mlog$_order
where true and
    (mlog$_order.TIME$$ > 0) and
    ((mlog$_order.OLD$$ in ('O', 'U') and is_equijoin(CHG$$))   {1}
    or (mlog$_order.OLD$$ = 'O' and is_filter(CHG$$)   {2}
        and not exist (select NULL from mview$
          where mview$.OID = mlog$_order.OID))
    or (mlog$_order.MOD$$ = 'D'))   {3}

---

In this query, mlog$_order stands for the order log. In the example, order log 1206 has two entries. The first entry records an OID of 4 as the primary key, a 'U' for both MOD$$ and OLD$$, and a CHG$$ bit vector of '01 . . . ', which indicates that the CID equijoin column was modified. The second entry is the same as the first entry except an OID of 3 is recorded.

Considering condition {1}, the primary key values of both entries are selected, because the OLD$$ column is a 'U' and the CHG$$ bit vector indicates that an equijoin column was modified. Condition {2} is false because the CID is not a filter column, and condition {3} does not hold either because neither entry was deleted and marked with a 'D' in the MOD$$ column.

The primary key values, determined in step 1002, are used to delete the rows from the snapshot identified by those primary key values in step 1004. In one embodiment, the rows are selected and deleted by the following SQL statement:

---

[QUERY 5]

--- delete from snap$ where [primary key]
    in [primary key values selected from QUERY 4]

---

In QUERY 5, snap$ stands for the name of the snapshot being refreshed. In the example, for order log 1206, QUERY 4a selects two primary key values, 3 and 4. Applying those primary key values to the delete statement, only one row of order line snapshot 1300 of FIG. 13(a) is selected for deletion, marked in dashed lines. The result of the deletion is order line snapshot 1310.

After deleting rows from the snapshot (step 1004), execution loops back to step 1000. When execution loops back to step 1000, another inner table is considered, in this example, the customer table. At step 1002, the following SQL statement is generated according to one embodiment to select the primary key values:

---

[QUERY 4b]

--- select distinct CID from mlog$__cust
where mlog$__cust.ZIP >= 19555 and
    (mlog$__cust.TIME$$ > 0) and
    ((mlog$__cust.OLD$$ in ('O', 'U') and is__equijoin(CHG$$))  {1}
    or (mlog$__cust.OLD$$ = 'O' and is__filter(CHG$$))  {2}
        and not exist (select NULL from mview$
            where mview$.CID = mlog$__cust.CID))
    or (mlog$__cust.MOD$$ = 'D'))  {3}

---

In this query, mlog$ cust stands for the customer log. In the example, customer log 1208 has two entries. Of the two entries, only one satisfies the filter conditions, the entry having a CID of 2, a ZIP of 19555, a MOD$$ of 'U', an OLD$$ of 'O', and a CHG$$ bit vector of '0 . . . '.

Considering condition {1}, the entry does not have a modified equijoin column, so the primary key value from the entry is not selected by this condition. Condition {2} is true for the entry, because OLD$$ is 'O', the CHG$$ indicates that a filter column, ZIP, was modified, and there are no entries in mview$, new order line snapshot 1202, having a CID of 2. Conditions {1, 2, and 3} are always false for an entry having an OLD$$ of 'N', which is one reason why it is not necessary to record the new filter values.

Condition {3} does not hold for the entry because neither MOD$$ is 'D.'

Thus, the primary key value from customer log 1208 used to select the rows to delete in step 1002 is a CID of 2. Order line snapshot 1302 depicts those rows of the snapshot having a CID of 2, marked with dashed lines. Those rows are selected and deleted, resulting in order line snapshot 1320.

After considering customer log 1208 for rows to delete, execution proceeds back to loop control step 1000. Since all the inner tables were considered, in the example, the second pass starting at step 1010 is executed.

Inner Table Insertion Pass

At step 1010, the second pass, each inner table is successively considered. Within the loop, starting at step 1012, rows are selected from the new snapshot based on primary key values from each inner table master log. In one embodiment, to select those rows the database system generates and executes an SQL statement whose general form is as follows:

---

[QUERY 6]

--- select [snap columns] from mview$,
    (select distinct [primary key] from mlog$
    where (TIME$$ > snaptime) and
        ((MOD$$ = 'U' and OLD$$ = 'O' and  {1}
            not [filter satisfied] and is__filter(CHG$$))
        or (MOD$$ 'U' and OLD$$ in ('O', 'U') and  {2}
            [filter satisfied] and is__equijoin(CHG$$))
        or (MOD$$ = 'I' and [filter satisfied])) log  {3}
where log.[primary key] = mview$.[equijoin column];

---

In this query, the material in brackets is filled in with the appropriate matter, according to the snapshot definition query and the master log, when the SQL query is generated.

The snaptime identifier is the timer of the previous refresh to avoid selecting rows that are known to have been used in the previous refresh. The identifier mlog$ stand for the particular master log under consideration. The identifier mview$ stands for the "truth," the actual values with which the refresh snapshot is made consistent. The macros is__filter and is__equijoin test the CHG$$ vector to determine whether a filter column or an equijoin column was changed, respectively. The final line of the SQL statement, joins the primary key value from a master log with the "truth" to determine which rows actually need to be inserted.

If one of the following conditions, annotated with a number in braces, is true, the primary key value from mlog$ is used to select rows from mview$ into the snapshot:

{1} A filter column was modified, whose old value was out of the snapshot. It is possible for a filter value to change multiple times between refreshes, thus it is important to determine whether any one of those changes in filter values potentially causes the row to be in the snapshot.

{2} An equijoin column was changed in any entry that also satisfies the filter condition. Preferably, all changed equijoin columns were removed in step 1002.

{3} A row was inserted into the inner table.

For example, if the first inner table being considered is the order table, then the following SQL statement is generated according to an embodiment:

---

[QUERY 6a]

--- select OLID,OID, . . . ,CID from mview$,
    (select distinct OID from mlog$__order
    where (TIME$$ > 0) and
        ((MOD$$ = 'U' and OLD$$ in ('O', 'U')  {2}
            and is__equijoin(CHG$$))
        or (MOD$$ = 'I')) log  {3}
where log.OID = mview$.OID;

---

In this query, mlog$ order stands for the order log. Since no filter information is needed for the order table, QUERY 6a is not generated with the filter column condition {1}. In the example, order log 1206 has two entries. The first entry records an OID of 4 as the primary key, a 'U' for both MOD$$ and OLD$$, and a CHG$$ bit vector of '01 . . . ', which indicates that the CID equijoin column was modified. The second entry is the same as the first entry except an OID of 3 is recorded.

Considering condition {2}, both entries have a MOD$$ of 'U' and an OLD$$ of 'U' and a CHG$$ that indicated that an equijoin column was modified. Thus, OID values of both 4 and 3 are selected. Condition {3} is false because neither row was inserted.

The OID values of 4 and 3 are then joined to the "truth." Only one row in new order line snapshot 1202 matches, and that row has an OLID of 7, an OID of 3, and a CID of 4. This row is inserted at step 1014 into the order line snapshot 1330, ignoring duplicate row errors, to produce order line snapshot 1340 in FIG. 13(*b*).

After inserting rows into the snapshot (step 1014), execution loops back to step 1010, where another inner table is consider. In this example, that table is the customer table. Accordingly, at step 1012, the following SQL statement is generated to select the proper rows from new order line snapshot 1202:

[QUERY 6b]

```
select OLID,OID, . . . ,CID from mview$,
    (select distinct CID from mlog$_cust
    where (TIME$$ > snaptime) and
        ((MOD$$ = 'U' and OLD$$ = 'O' and                    {1}
            not (mlog$_cust.ZIP >= 19555) and is_filter(CHG$$))
        or (MOD$$ = 'U' and OLD$$ in ('O', 'U') and          {2}
            (mlog$_cust.ZIP >= 19555 and is_equijoin(CHG$$))
        or (MOD$$ = 'I' and (mlog$_cust.ZIP >= 19555)) log   {3}
where log.CID = mview$.CID;
```

In this query, mlog$_cust stands for the customer log. In the example, customer log 1208 has two entries. One entry has a CID of 2, a ZIP of 19555, a MOD$$ of 'U', an OLD$$ of 'O', and a CHG$$ bit vector of '01 . . . '; the other entry has a CID of 4, a ZIP of 19545, a MOD$$ of 'U', an OLD$$ of 'O', and a CHG$$ bit vector of '01 . . . '. Neither entry satisfies condition {3}, because none of them are insertions. If the new values of filter columns were recorded, then the corresponding entry would not satisfy either condition {1} or condition {2}, because the OLD$$ value is 'N', which is another reason why it is not necessary to record the new filter values.

Neither condition {2} nor condition {3} hold for the two entries in customer log 1208. Neither entry has a changed equijoin column, and neither entry is an insertion. Considering condition {1}, the CID for the first entry is not selected because its filter condition holds, being greater than or equal to 19555. For the second entry, the CID of 4 is selected because it has a MOD$$ of 'U', an OLD$$ of 'O', its filter condition does not hold, and its filter column was changed.

Thus, the CID value of 4 is joined against the "truth" to determine which rows of the new order line snapshot 1202 are selected to be inserted into order line snapshot 1340. In this example, two rows of new older line snapshot 1202 are selected. Order line snapshot 1350 shows in dashed lines those two rows that are inserted. One of those rows was already inserted in the previous iteration, but because of the primary key constraint on the snapshot, that row is not duplicated.

After performing step 1014, execution loops back to loop control step 1010.

Since all the inner tables were considered, in the example, the second pass is complete.

Processing the Outer Table

Figure 11:
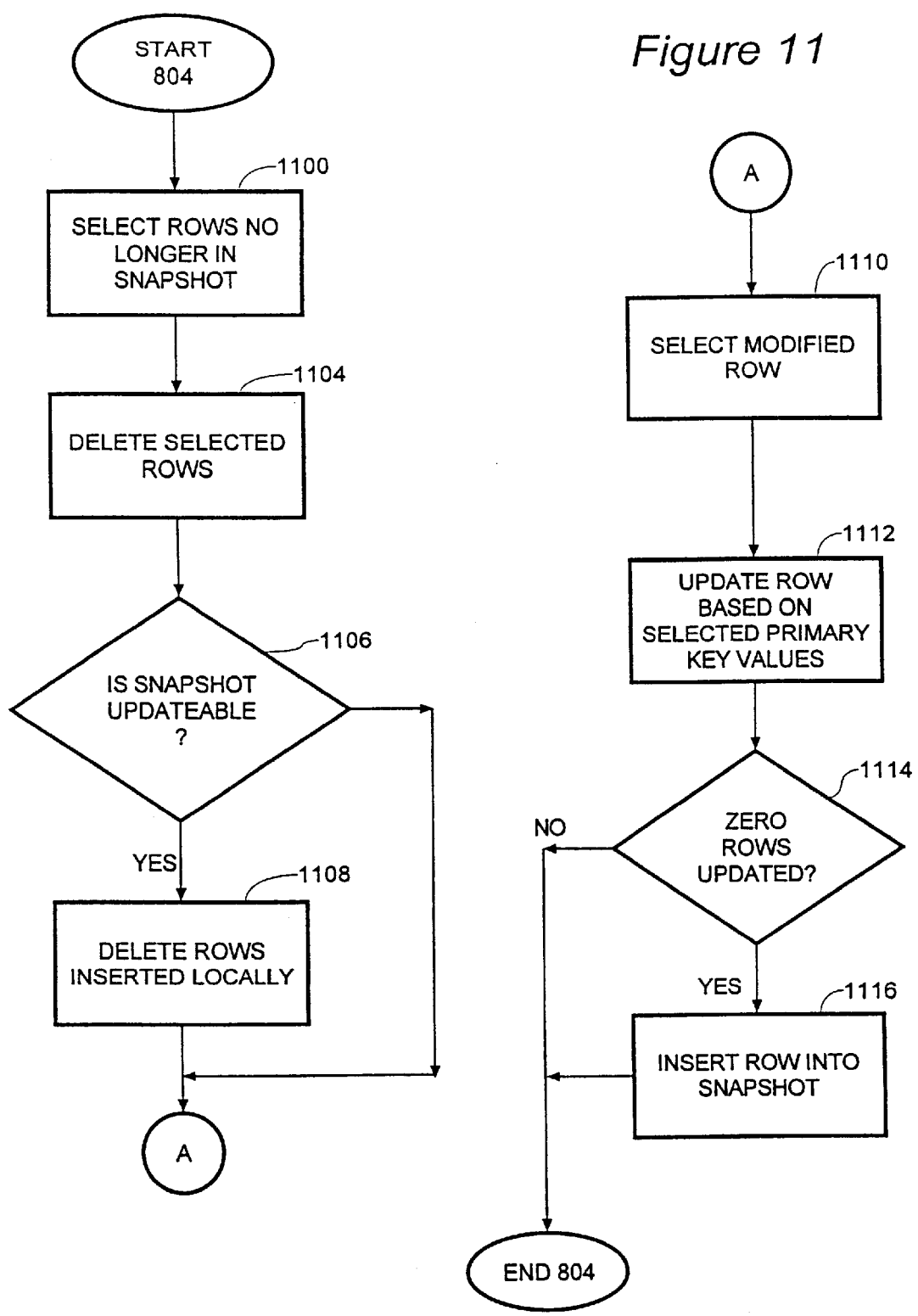
FIG. 11 is a flowchart illustrating the operation of processing the outer table.

With reference to FIG. 11, the operation of step 804 is further described. Processing the outer table involves two phases. The first phase deletes rows in the snapshot due to changes in the outer table, and the second phase inserts or modifies rows in the snapshot due to changes in the outer table. The successive states of the order line snapshot in the example are illustrated in FIG. 13(c).

At step 1100, primary key values are selected from the outer table log, in which those primary key values no longer belong to the new snapshot. In one embodiment, the following SQL query is generated:

[QUERY 7]

```
select distinct [primary key] from mlog$
    where (mlog$.TIME$$ > snaptime) and
        (mlog$.MOD$$ != 'I') and
        (mlog$.[primary key] not in mview$);
```

In this query, the material in brackets is appropriately filled according to the snapshot definition query and the outer table log when the query is generated. The snaptime identifier is the time of the previous refresh to avoid selecting rows that are known to have been previously used. The miogs identifier stands for the outer table log, and the identifier mview$ stands for the "truth," the actual values with which the refresh snapshot is made consistent. This query selected primary key values of rows that were not inserted and not found in the new snapshot. In the example, the following query is generated for the outer, order line table:

[QUERY 7a]

```
select distinct OLID from mlog$_order_line
    where (mlog$_order_line.TIME$$ > snaptime) and
        (mlog$_order_line.MOD$$ != 'I') and
        (mlog$_order_line.OLID not in mview$);
```

In this query, mlog$_order_line stands for the order line log. In the example, order line log 1204 has two entries. One entry has an OLID of 3, and OLD$$ of 'O', and a MOD$$ of 'D'. The other entry has an OLID of 8, and OLD$$ of 'N', and a MOD$$ of 'I'.

Of the two entries, only the first entry is not an insertion, which has a MOD$$ of 'I'. Therefore, the primary key value of 3 is selected by QUERY 7a. This primary key value is used to delete rows in step 1104. In the example, since no row of order line snapshot 1360 has an OLID of 3, no row is deleted.

After performing step 1104, execution proceeds to decision step 1106, where the snapshot is checked to determine whether it is updateable. If it is, then locally inserted rows are selected from the updateable snapshot log and deleted (step 1108). After performing step 1108, execution proceeds to step 1110. On the other hand, if the snapshot is not updateable, then execution skips step 1108 and proceeds to step 1110. In the example, the snapshot is not updateable, so step 1006 is skipped.

At step 1110, updated or inserted rows are selected from the new snapshot based on primary key values recorded in the outer table. In one embodiment, the following SQL query is generated:

[QUERY 8]

```
select * from mview$,
    (select distinct [primary key] from mlog$
    where (mlog$.TIME$$ > snaptime)
        and (mlog$.MOD$$ != 'D')) ml
where ml.[primary key] = mview$.[primary key];
```

In this query, the material in brackets is appropriately filled according to the snapshot definition query and the outer table log when the query is generated. The snaptime identifier is the time of the previous refresh to avoid selecting rows that are known to have been previously used. The mlog$ identifier stands for the outer table log, and the identifier mview$ stands for the "truth," the actual values with which the refresh snapshot is made consistent. This query selected primary key values of rows that were not inserted and not found in the new snapshot. In the example, the following query is generated for the outer, order line table:

[QUERY 8a]

```
select * from mview$,
    (select distinct OLID from mlog$_order_line
    where (mlog$_order_line.TIME$$ > snaptime)
        and (mlog$_order_line.MOD$$ != 'D')) ml
    where ml.OLID = mview$.OLID;
```

In this query, mlog$_order_line stands for the order line log. In the example, order line log 1204 has two entries. One entry has an OLID of 3, and OLD$$ of 'O', and a MOD$$ of 'D'. The other entry has an OLID of 8, and OLD$$ of 'N', and a MOD$$ of 'I'.

Of the two entries, only the second entry does not have a MOD$$ of 'D'. Therefore, the primary key value of 8 is selected by QUERY 8a. Each row selected by the query is processed individually in a loop, controlled at step 1112. In this example, only one iteration of the loop is described, because only one primary key value was selected. This primary key is joined with the "truth" to fetch a row from the new snapshot to update or insert into the snapshot. At step 1114, the fetched row is used to update a row with the same primary key value in the snapshot. If that row exists in the snapshot, then the update operation succeeds. If that row does not exist in the snapshot, then the update operation returns an error that indicates that zero rows were processed.

Accordingly, step 1116 checks the return code of the update operation for the indication that zero rows were processed. If no rows were processed, then that row did not already exist in the snapshot and needs to be inserted into the snapshot. Thus, execution in this case proceeds to step 1118 where the row is inserted into the snapshot. In the example, the row in the new snapshot with a primary key value of 8 is not found in the order line snapshot 1360. Therefore, that row, marked with dashes, is inserted into the snapshot to create snapshot 1370.

After performing step 1118, execution loops back to step 1112 so that other selected rows may be processed. If there are no more rows to process, the operation of processing the outer table is now complete, and it is evident that order line snapshot 1370 is now consistent with new order line snapshot 1202.

For updateable snapshots, QUERY 7 and QUERY 8 would employ an extra union with the updateable snapshot log. Thus, the updateable snapshot logs and the master logs are inspected, because it is possible that not all of the modifications to the snapshot resulted in entries in the master logs due, for example, to the way a conflict was resolved with asynchronous replication.

Wrap-Up

Figure 9B:
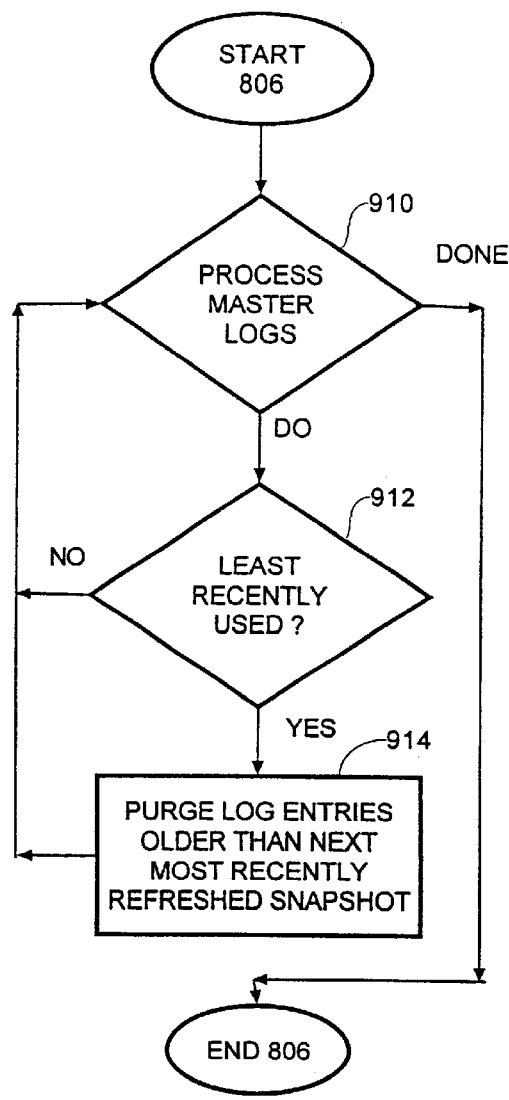

The purpose of wrap-up step 806 is to purge entries from the master logs that are no longer needed. With reference to FIG. 9(b), the database system processes each master log in turn (step 910). If the current refreshing snapshot is the least recently refreshing snapshot (step 912), then step 914 is performed. Step 914 purges all log entries from the master log older than the timestamp of next most recently refreshed snapshot. The refresh time for the current refreshing snapshot is updated at the master site. In this manner, the master logs are periodically pruned, saving disk storage.

Joint Processing of the Inner and Outer Tables

Figure 8B:
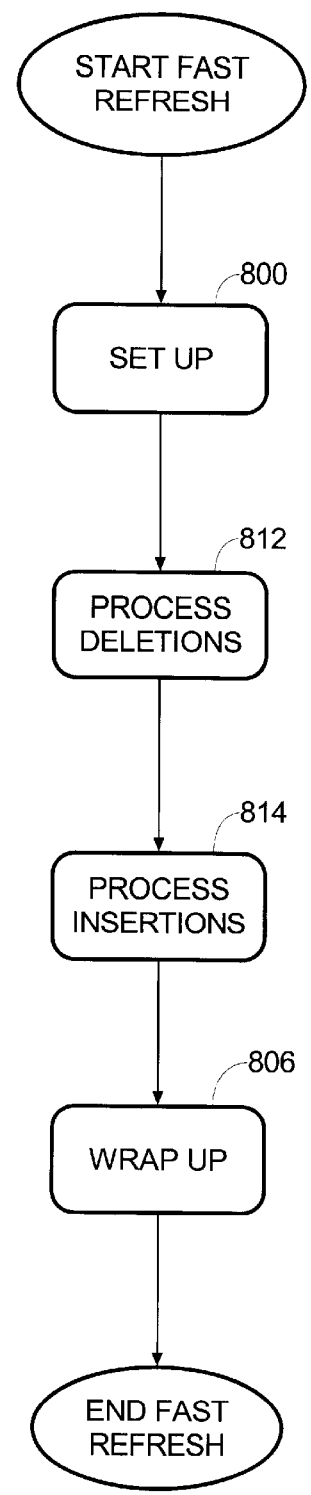
FIG. 8(b) is a flowchart illustrating the steps of fast refreshing a snapshot according to another embodiment.

According to another embodiment, instead of looping over the inner tables separately from the outer tables, all the master tables are processed jointly by issuing queries that perform a union over the master tables. The high level steps of the fast refresh operation according to his embodiment are shown in FIG. 8(b). In response to initiation of a fast refresh operation, the database system at the master site starts with the "set-up" step (step 800), as described above. After the set-up, the master tables are processed to determine which rows to remove from the snapshot (step 812). After the master tables are processed for deleted rows, the master tables are processed to determine which snapshot rows need to be inserted or modified (step 814). The second pass can be accomplished using a union instead of explicitly looping. The union can filter out duplicate insertions or deletions. The final high-level step is the "wrap-up" step (step 806), as described above.

Foreign Key Subqueries

It may noticeable in the above description of fast refreshing a subquery snapshot, that the described method sometimes causes the same row to be deleted from or inserted into the snapshot multiple times. These redundant deletions and insertions affect performance, especially over a network. Therefore, one embodiment of the invention includes steps to detect a common case that causes multiply redundant insertions and deletions to occur and avoid them.

One of the restrictions for allowable subquery snapshots requires that inner and outer table be correlated by an equijoin on a primary key column in the inner table. With the additional requirement of having a non-deferred, foreign key constraint on a equijoin column of the outer table, then some of the redundant insertions and deletions can be avoided. For example, the OID column of the order table can be specified as a foreign key of the OID column in the order line table. In this situation, an entry defining the OID must exist in the order table before a new row with that OID can be added to the order line table. Likewise, an entry defining the OID in the order table cannot be deleted with first removing all the rows in the order line table having that OID. Therefore, the outer table feels all the effects of inserting or deleting an inner table row that serves as a foreign key of an equijoin column of the outer table.

In particular, one embodiment of the invention generates QUERY 4 and QUERY 6 with condition {3} augmented by a conjunctive predicate that indicates that foreign key relation is not present. In another embodiment, a union of each of the rows selected for insertion due to modifications is used to filter out duplicate insertions.

Assignment Table Subqueries

Figure 3:
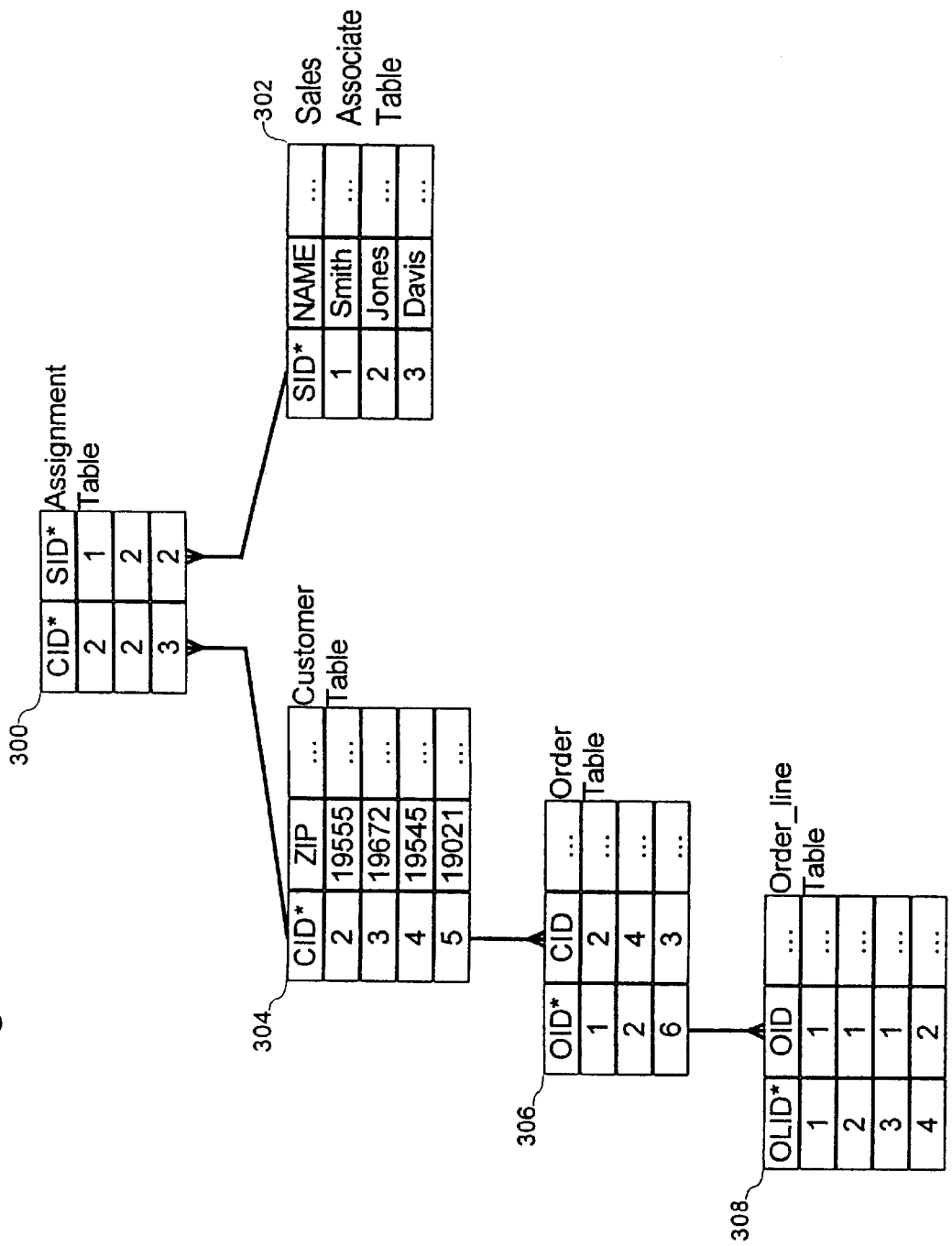
FIG. 3 depicts an assignment table and a sales associate table.

One reason why tables were denormalized under prior fast refresh methods is to obtain the performance benefits of fast refresh with a table that has a many-to-one relationship. Yet fast refreshes can be performed on assignment tables, which are a common example in which a many-to-many relationship. For example, FIG. 3 depicts five related tables, one of which is an assignment table 300, which assigns customers to sales associates. Each customer can be assigned multiple sales associates and each sales associate can be assigned to multiple customers. An assignment table has a set of columns that are jointly unique and non-null, hence together constituting a primary key for the assignment table.

Order line table 308 is an outer table having an OID equijoin column in a many-to-one relationship with the OID primary key column in order table 306. Order table 306 has a CID equijoin column in a many-to-one relationship with the CID primary key column of customer table 304.

However, the CID primary key column of customer table 304 is in a one-to-many relationship with the CID column in assignment table 300. Assignment table 300 also comprises an SID column, which is correlated with a primary key column of sales associate table 302. Sales associate table 302 includes a NAME column, which has a uniqueness constraint.

Subqueries involving assignment tables may be fast refreshed with the above-described method, if each column of the primary key of the assignment table is a unique value or equated to a unique value. In this example, both the CID column and the SID column of assignment table 300 are correlated to unique values, because each column is primary key of another table. Accordingly, subquery snapshots involving one-to-many relationships can be fast refreshed without denormalization simply by creating a new assignment table.

In the foregoing specification, the invention has been described with reference to specific embodiments thereof. It will, however, be apparent that various modifications and changes may be made there without departing from the broader spirit and scope of the invention. The specification and drawings are, accordingly, to be regarded in an illustrative rather than a restrictive sense.

What is claimed is:

1. A method of refreshing a snapshot, comprising the computer-implemented steps of:
   creating said snapshot based on a snapshot definition query on a plurality of master tables, wherein said snapshot definition query contains one or more subqueries;
   detecting a modification to a row of one of said plurality of master tables;
   in response to detecting said modification, recording the value of a primary key stored in said row in a master log; and
   in response to initiation of a refresh operation, reconciling differences between said snapshot and said master tables based on said master log.

2. A method of refreshing a snapshot, comprising the computer-implemented steps of:
   creating said snapshot based on a plurality of master tables, comprising an outer table and one or more inner tables, and a snapshot definition query containing at least one subquery on an inner table of said plurality of master tables, wherein each master table has a respective primary key;
   detecting a modification to a row of one of said plurality of master tables;
   in response to detecting said modification, recording the value of the primary key stored in said row in a master log; and
   in response to initiation of a refresh operation, reconciling differences between said snapshot and said plurality of master tables based on said master log.

3. The method of claim 2, wherein the step of reconciling differences between said snapshot and said plurality of master tables based on said master log includes the steps of:
   reconciling differences between said snapshot and said one or more inner tables based on said master log; and
   after the performing the step of reconciling differences between said snapshot and said one or more inner tables, reconciling differences between said snapshot and said outer table based on said master log.

4. The method of claim 2, wherein the step of reconciling differences between said snapshot and said plurality of master tables based on said master log includes the steps of:
   reconciling deletions made to said plurality of master tables with said snapshot based on said master log; and
   after the performing the step of reconciling deletions, reconciling insertions and modifications made to said plurality of master tables with based on said master log.

5. A method of refreshing a snapshot, comprising the computer-implemented steps of:
   creating said snapshot based on a first table having a first primary key, a second table having a second primary key, and a snapshot definition query on said first table, wherein said snapshot definition query contains a subquery on said second table, which has an equijoin predicate on a unique key of said second table and on an equijoin column of said first table;
   detecting a first modification to a first row of said first table;
   in response to detecting said first modification, recording the value of said first primary key stored in said first row of said first table and a first value indicative of said first modification in a first log;
   detecting a second modification to a second row of said second table;
   in response to detecting said second modification, recording the value of said second primary key stored in said second row of said second table, and a second value indicative of said second modification in a second log; and
   in response to initiation of a refresh operation, reconciling differences between said snapshot, said first table, and said second table based on said snapshot definition query, said first log, said second log, said first table, said second table, and said snapshot.

6. The method of claim 5, wherein the step of creating said snapshot based on a first table having a first primary key, a second table having a second primary key, and a snapshot definition query on said first table includes the step of storing within said snapshot the value of said first primary key from said first table and the value of said second primary key from said second table.

7. The method of claim 6, wherein the step of reconciling differences between said snapshot, said first table, and said second table based on said snapshot definition query, said first log, said second log, said first table, said second table, and said snapshot includes the steps of:
   selecting a log row from said first log, wherein the first value stored in said log row indicates that a corresponding row of said first table was deleted; and
   removing a snapshot row from said snapshot, wherein the value of the first primary key stored in said snapshot row equals the value of the first primary key stored in said log row.

8. The method of claim 6, wherein the step of reconciling differences between said snapshot, said first table, and said second table based on said snapshot definition query, said first log, said second log, said first table, said second table, and said snapshot includes the steps of:
   selecting a log row from said first log, wherein the first value stored in said log row indicates that the value of said equijoin column of a corresponding row of said first table was changed; and
   removing a snapshot row from said snapshot, wherein the value of the first primary key stored in said snapshot row equals the value of the first primary key stored in said log row.

9. The method of claim 6, wherein the step of reconciling differences between said snapshot, said first table, and said second table based on said snapshot definition query, said first log, said second log, said first table, said second table, and said snapshot includes the steps of:

selecting a log row from said first log, wherein the first value stored in said log row indicates that the value of said first primary key of a corresponding row of said first table was changed; and removing a snapshot row from said snapshot, wherein the value of the first primary key stored in said snapshot row equals the old value of the first primary key stored in said log row.

10. The method of claim 6, wherein the step of reconciling differences between said snapshot, said first table, and said second table based on said snapshot definition query, said first log, said second log, said first table, said second table, and said snapshot includes the steps of:

selecting a log row from said first log, wherein the first value stored in said log row indicates that a corresponding row of said first table was inserted; and inserting a snapshot row into said snapshot, wherein:

the value of the first primary key stored in said snapshot row equals the value of the first primary key stored in said log row; and the value of the second primary key stored in snapshot row equals the value of the second primary key of a row of said second table satisfying said subquery.

11. The method of claim 6, wherein the step of reconciling differences between said snapshot, said first table, and said second table based on said snapshot definition query, said first log, said second log, said first table, said second table, and said snapshot includes the steps of:

selecting a log row from said first log, wherein the first value stored in said log row indicates that the value of said equijoin column of a corresponding row of said first table was changed; and inserting a snapshot row into said snapshot, wherein:

the value of the first primary key stored in said snapshot row equals the value of the first primary key stored in said log row; and the value of the second primary key stored in snapshot row equals the value of the second primary key of a row of said second table satisfying said subquery.

12. The method of claim 6, wherein the step of reconciling differences between said snapshot, said first table, and said second table based on said snapshot definition query, said first log, said second log, said first table, said second table, and said snapshot includes the steps of:

selecting a log row from said first log, wherein the first value stored in said log row indicates that the value of said first primary key of a corresponding row of said first table was changed; and inserting a snapshot row into said snapshot, wherein:

the value of the first primary key stored in said snapshot row equals the new value of the first primary key stored in said log row; and the value of the second primary key stored in snapshot row equals the value of the second primary key of a row of said second table satisfying said subquery.

13. The method of claim 6, wherein the step of reconciling differences between said snapshot, said first table, and said second table based on said snapshot definition query, said first log, said second log, said first table, said second table, and said snapshot includes the steps of:

selecting a log row from said first log, wherein the first value stored in said log row indicates that the value of a column of a corresponding row of said first table was changed, wherein said column is not said equijoin column nor part of said first primary key; and updating a snapshot row of said snapshot with values from said corresponding row of said first table, wherein:

the value of the first primary key stored in said snapshot row equals the value of the first primary key stored in said log row; and the value of the second primary key stored in snapshot row equals the value of the second primary key of a row of said second table satisfing said subquery.

14. The method of claim 6, wherein the step of reconciling differences between said snapshot, said first table, and said second table based on said snapshot definition query, said first log, said second log, said first table, said second table, and said snapshot includes the steps of:

selecting a log row from said second log, wherein the second value stored in said log row indicates that a corresponding row of said second table was deleted; and removing a snapshot row from said snapshot, wherein the value of the second primary key stored in said snapshot row equals the value of the second primary key stored in said log row.

15. The method of claim 14, wherein the step of removing a snapshot row from said snapshot includes the step of removing said snapshot row only when said equijoin column of said first table is not a foreign key.

16. The method of claim 6, wherein the step of reconciling differences between said snapshot, said first table, and said second table based on said snapshot definition query, said first log, said second log, said first table, said second table, and said snapshot includes the steps of:

selecting a log row from said first log, wherein the second value stored in said log row indicates that the value of said second primary key of a corresponding row of said second table was changed; and removing a snapshot row from said snapshot, wherein the value of the second primary key stored in said snapshot row equals the old value of the second primary key stored in said log row.

17. The method of claim 6, wherein the step of reconciling differences between said snapshot, said first table, and said second table based on said snapshot definition query, said first log, said second log, said first table, said second table, and said snapshot includes the steps of:

selecting a log row from said second log, wherein the second value stored in said log row indicates that a corresponding row of said second table was inserted; and inserting a snapshot row into said snapshot, wherein:

the value of the first primary key stored in said snapshot row equals the value of the first primary key stored in said log row; and the value of the second primary key stored in snapshot row equals the value of the second primary key of a row of said second table satisfying said subquery.

18. The method of claim 17, wherein the step of inserting a snapshot row from said snapshot includes the step of inserting said snapshot row into said snapshot only when said equijoin column of said first table is not a foreign key.

19. The method of claim 6, wherein the step of reconciling differences between said snapshot, said first table, and said second table based on said snapshot definition query, said first log, said second log, said first table, said second table, and said snapshot includes the steps of:

selecting a log row from said second log, wherein the second value stored in said log row indicates that the old value of said second primary key of a corresponding row of said second table was changed; and inserting a snapshot row into said snapshot, wherein:
the value of the first primary key stored in said snapshot row equals the new value of the first primary key stored in said log row; and
the value of the second primary key stored in snapshot row equals the value of the second primary key of a row of said second table satisfying said subquery.

20. The method of claim 6, wherein:
the step of creating a snapshot includes the step of creating said snapshot based on a first table having a first primary key, a second table having a second primary key, and a snapshot definition query on said first table, wherein said snapshot definition query contains a subquery on said second table, which has an equijoin predicate on a unique key of said second table and on an equijoin column of said first table and a filter predicate on a filter column of said second table; and
said method further comprises the step of:
in response to detecting said second modification, recording the value of said second primary key stored in said second row of said second table, the old value of said filter column of said second row of said second table, and a second value indicative of said second modification in a second log.

21. The method of claim 20, wherein the step of reconciling differences between said snapshot, said first table, and said second table based on said snapshot definition query, said first log, said second log, said first table, said second table, and said snapshot includes the steps of:
selecting a log row from said second log, wherein:
the second value stored in said log row indicates that a corresponding row of said second table was deleted; and
the old value of said filter column of said corresponding row of said second table satisfied said filter predicate; and
removing a snapshot row from said snapshot, wherein the value of the second primary key stored in said snapshot row equals the value of the second primary key stored in said log row.

22. The method of claim 20, wherein the step of reconciling differences between said snapshot, said first table, and said second table based on said snapshot definition query, said first log, said second log, said first table, said second table, and said snapshot includes the steps of:
selecting a log row from said second log, wherein:
the second value stored in said log row indicates that the value of said filter column of a corresponding row of said second table was changed; and
the old value of said filter column of said corresponding row of said second table satisfied said filter predicate; and
removing a snapshot row from said snapshot, wherein the value of the second primary key stored in said snapshot row equals the value of the second primary key stored in said log row.

23. The method of claim 22, wherein the step of removing a snapshot row from said snapshot includes the step of removing said snapshot row from said snapshot only when the new value of said filter column of said corresponding row of said second table satisfies said filter predicate.

24. The method of claim 20, wherein the step of reconciling differences between said snapshot, said first table, and said second table based on said snapshot definition query, said first log, said second log, said first table, said second table, and said snapshot includes the steps of:
selecting a log row from said first log, wherein:
the second value stored in said log row indicates that the value of said second primary key of a corresponding row of said second table was changed; and
the old value of said filter column of said corresponding row of said second table satisfied said filter predicate; and
removing a snapshot row from said snapshot, wherein the value of the second primary key stored in said snapshot row equals the old value of the second primary key stored in said log row.

25. The method of claim 20, wherein the step of reconciling differences between said snapshot, said first table, and said second table based on said snapshot definition query, said first log, said second log, said first table, said second table, and said snapshot includes the steps of:
selecting a log row from said second log, wherein the second value stored in said log row indicates that a corresponding row of said second table was inserted; and
inserting a snapshot row into said snapshot, wherein:
the value of the first primary key stored in said snapshot row equals the value of the first primary key stored in said log row;
the value of the second primary key stored in snapshot row equals the value of the second primary key of a row of said second table satisfying said subquery; and
the new value of said filter column of said corresponding row of said second table satisfies said filter predicate.

26. The method of claim 25, wherein the step of inserting a snapshot row from said snapshot includes the step of inserting said snapshot row into said snapshot only when said equijoin column of said first table is not a foreign key.

27. The method of claim 20, wherein the step of reconciling differences between said snapshot, said first table, and said second table based on said snapshot definition query, said first log, said second log, said first table, said second table, and said snapshot includes the steps of:
selecting a log row from said second log, wherein the second value stored in said log row indicates that the value of said filter column of a corresponding row of said second table was changed; and
inserting a snapshot row into said snapshot, wherein:
the value of the first primary key stored in said snapshot row equals the value of the first primary key stored in said log row;
the value of the second primary key stored in snapshot row equals the value of the second primary key of a row of said second table satisfying said subquery; and
the new value of said filter column of said corresponding row of said second table satisfies said filter predicate.

28. The method of claim 27, wherein the step of inserting a snapshot row into said snapshot includes the step of inserting said snapshot row into said snapshot only when the old value of said filter column of said corresponding row of said second table did not satisfy said filter predicate.

29. The method of claim 20, wherein the step of reconciling differences between said snapshot, said first table, and said second table based on said snapshot definition query, said first log, said second log, said first table, said second table, and said snapshot includes the steps of:

selecting a log row from said second log, wherein the second value stored in said log row indicates that the old value of said second primary key of a corresponding row of said second table was changed; and inserting a snapshot row into said snapshot, wherein:
the value of the first primary key stored in said snapshot row equals the new value of the first primary key stored in said log row;
the value of the second primary key stored in snapshot row equals the value of the second primary key of a row of said second table satisfying said subquery; and
the new value of said filter column of said corresponding row of said second table satisfies said filter predicate.

30. A method of refreshing a snapshot, comprising the computer-implemented steps of:

receiving a refresh command indicating an initiation of a refresh operation;

detecting a modification to a row of one of said plurality of master tables;

in response to detecting said modification, recording the value of a primary key stored in said row in a master log; and in response to receiving the refresh command, reconciling differences between a plurality of master tables and a snapshot created based on a snapshot definition query on the master tables and based on said master log, wherein said snapshot definition query contains one or more subqueries.

31. A method of refreshing a body of data constructed of a plurality of master tables, including an outer table and at least one inner table based on a definition query having at least one subquery on the at least one inner table, comprising the steps of:

detecting a modification to a row of one of said plurality of master tables;

in response to detecting said modification, recording the value of a primary key stored in said row in a master log; and in response to initiation of a refresh operation, reconciling differences between said body of data and said plurality of master tables based on said master log.

32. A method of refreshing a body of data constructed of data from a plurality of master tables including a first table having a first primary key and a second table having a second primary key, comprising the steps of:

creating said body of data based on the first table, a second table, and a definition query on said first table, wherein said definition query contains a subquery on said second table, which has an equijoin predicate on a unique key of said second table and on an equijoin column of said first table;

detecting a first modification to a first row of said first table;

in response to detecting said first modification, recording the value of said first primary key stored in said first row of said first table and a first value indicative of said first modification in a first log;

detecting a second modification to a second row of said second table;

in response to detecting said second modification, recording the value of said second primary key stored in said second row of said second table, and a second value indicative of said second modification in a second log; and reconciling differences between said body of data, said first table, and said second table based on said definition query, said first log, said second log, said first table, said second table, and said body of data.

33. The method of claim 32, wherein the step of creating said body of data based on a first table, a second table, and a definition query on said first table includes the step of storing within said body of data the value of said first primary key from said first table and the value of said second primary key from said second table.

* * * * *